United States Patent [19]

Sharma et al.

[11] Patent Number: 5,554,747
[45] Date of Patent: Sep. 10, 1996

[54] OPTICAL AMPLIFIER

[75] Inventors: Prem K. Sharma; Arie R. Van Doorn; Aemilianus G. J. Staring, all of Einhoven, Netherlands

[73] Assignee: U.S. Philips Corporation, New York, N.Y.

[21] Appl. No.: 488,307

[22] Filed: Jun. 7, 1995

Related U.S. Application Data

[62] Division of Ser. No. 226,184, Apr. 11, 1994, Pat. No. 5,490,010.

[51] Int. Cl.$^6$ .................................................. C07D 207/22
[52] U.S. Cl. .................................................. 540/456; 540/459
[58] Field of Search ................................. 540/456, 459

[56] References Cited

U.S. PATENT DOCUMENTS 5,220,012  6/1993  Mathis et al. ..................... 540/459
5,245,038  9/1993  Hale et al. ......................... 546/263
5,252,740  10/1993  Hale et al. ....................... 546/263

OTHER PUBLICATIONS

"Optical Master Action in AnEu+3 Containing Organic Matrix" N. E. Wolff et al, Applied Physics Letters, vol. 2, No. 8, Apr. 15, 1963, pp. 152–154.

"Stimulated Optical Emission of a Tb3+ Chelate in a Vinylic Resin Matrix", E. H. Huffman, Physics Letters, vol. 7, No. 4, Dec. 1, 1963.

"Erbium Fibre Amplifiers and Lasers", R. J. Mears et al, Optical and Quantum Electronics 24, (1992), pp. 517–538.

*Primary Examiner*—Mark Hellner
*Attorney, Agent, or Firm*—Leroy Eason

[57] ABSTRACT

An optical amplifier having an amplification medium which comprises a complex of a rare earth ion and a ligand, said complex being dissolved in a polymeric matrix, as well as an optical communications network comprising one or more optical amplifiers of the above-described polymeric type.

2 Claims, 4 Drawing Sheets $m = p = 0 \quad n = 1 \longrightarrow 111$ $m = n = 1 \quad p = 0 \longrightarrow 211$ $m = n = p = 1 \longrightarrow 221$ $m = n = 1 \quad p = 2 \longrightarrow 222$

OPTICAL AMPLIFIER

This is a division of application Ser. No. 08/226,184, filed Apr. 11, 1994, now U.S. Pat. No. 5,490,016.

The invention relates to an optical amplifier and an optical communications network comprising said optical amplifier.

Optical communication, such as in particular telecommunication by means of optical glass fibres has become very well known. When an optical signal is transmitted through an optical fibre, losses occur which cause the signal to be weakened. In order to compensate for this weakening of the signal, the optical fibre or optical cable has to be provided with regularly spaced amplifiers. Such an amplifier can be based on a system in which first the optical signal is convened into an electrical signal by means of, for example, a photodiode, after which said signal is amplified and then convened again into an amplified optical signal, for example, by means of a laser.

In the past five years, the trend has been towards directly amplifying an optical signal by means of a so-called optical amplifier without using an intermediate electrical amplifier.

The invention more particularly relates to an optical amplifier for a weak optical signal, said amplifier comprising an optical amplification medium which is provided with a rare earth ion, first optical means for sending the optical signal through the amplification medium, a laser pump for exciting the rare earth ion, second optical means for sending the pump signal originating from the laser pump through the amplification medium, and third optical means for passing on the amplified optical signal originating from the amplification medium.

Such an amplifier is for example known from Optical and Quantum Electronics 24 (1992), pp. 517–538.

The amplification medium of the known optical amplifier is a glass fibre which, as usual, comprises a core and a cladding of glass, a rare earth ion, notably $Er^{3+}$, being dissolved in said core. Such a glass fibre is also referred to as optical fibre.

A disadvantage of the known optical amplifier is that the concentration of the rare earth ion, such as $Er^{3+}$, in the core glass of the glass fibre is very small because otherwise so-called concentration quenching would occur. This implies that in order to attain a reasonable degree of amplification a great length of the glass fibre amplification medium is required. For example, in Electronic Letters, Vol. 25, No. 24, pp. 1656–1657 (Nov. 1989) an $Er^{3+}$-doped glass fibre having a length of 100 m is mentioned. The concentration was 100 ppm $Er^{3+}$. In this manner a gain in excess of 40 dB was attained.

When splitting optical fibres, there is a signal loss of approximately 3 dB. To compensate this signal loss, an optical glass fibre amplification medium of one or several meters is required. The price of such a glass fibre amplification medium is high and amounts to approximately 500–600 US$ per meter. For certain applications of optical systems this price is prohibitive.

In this context it is noted that Applicants have found that it is very interesting to apply optical communication, that is transmission via optical fibres, in in-home optical networks. These networks have a small transmission length in the range from a few meters to several hundred meters. Of course, said networks have many branches, resulting in a weakening of the signal which must be compensated for by optical amplification. The price of the currently available amplifiers causes in-home networks to be commercially unfeasible.

It is an object of the invention to provide an optical amplifier which performs well, is very cheap and extremely suitable for use in "in-home" optical networks.

In accordance with the invention, this object is achieved by an optical amplifier of the type mentioned in the opening paragraph, which is characterized in that the amplification medium comprises a complex of said rare earth ion and a ligand, said complex being dissolved in a polymeric matrix and said ligand encapsulating the rare earth ion and hence shielding it from high-frequency vibrations of the chemical bonds of the polymeric matrix, said ligand comprising chemical bonds with low-frequency vibrations, whereby the energy gap between the energy level of the rare earth ion during excitation and the relapse energy level is at least a factor of 4 greater than the energy of the low-frequency vibrations.

In a favourable embodiment of the optical amplifier in accordance with the invention, the ligand used is a β-diketone in accordance with formula (1) XZY wherein X and Y are equal or different and each of them represents an aromatic hydrocarbon group, in particular a benzene group, or an aliphatic hydrocarbon group, in particular an alkyl group having 1–10 C atoms which may be substituted with one or more halogen atoms, Z represents a hydrogen atom, a halogen atom, an alkyl group having 1–10 C atoms which may be substituted with one or more halogen atoms, or a nitro group, or the ligand is a cryptam, cinnamate, 2,6-pyridine dicarboxylic acid, a phthalocyanine compound or a mixture thereof.

The optical amplifier in accordance with this favourable embodiment satisfactorily amplifies the signal and can very suitably be incorporated in an optical network.

This applies, in particular, to an amplifier in which the ligand corresponds to the formula (2)

where X' and Y' are equal or different and each of them represents an alkyl group having 1–10 C atoms, which alkyl group is substituted with one or more fluorine atoms.

The best amplification results are obtained if the Europium ion ($Eu^{3+}$) is used as the rare earth ion in combination with a ligand selected from the group consisting of hexafluoroacetylacetate, 2,6-pyridine dicarboxylic acid or a mixture of hexafluoroacetylacetonate and a cryptate.

In a further favourable embodiment, the amplifier comprises an amplification medium in which the polymer which is used as a matrix is selected from the group consisting of polyalkylacrylate, polyalkylmethacrylate, in each of which groups the alkyl group may have up to 20 C atoms, polyvinyl alcohol, poly-[n-vinylpyridine], poly-[n-vinylpyrrolidone] and polycarbonate.

These preferred polymers have a polarity such that the aggregate formation of rare earth ions dissolved therein is reduced, which leads to an increase of the luminescence radiation. This point will be elaborated on at a later stage. A very suitable polymer which is liquid at room temperature is polylauryl methacrylate.

In the optical amplifier in accordance with the invention, use is preferably made of a rare earth ion selected from the group consisting of $Eu^{3+}$, $Tb^{3+}$, $Ho^{3+}$, $Er^{3+}$, $Nd^{3+}$, $Tm^{3+}$, $Sm^{3+}$ and $Dy^{3+}$.

It is noted that the maser action of several rare earth ions ($Eu^{3+}$ and $Tb^{3+}$) in an organic matrix is known per se.

Approximately 30 years ago two articles were published which dealt with such maser action. Said articles are entitled "Optical maser action in an $Eu^{3+}$-containing organic matrix" by N. E. Wolff and R. J. Pressley in Applied Physics Letters, Vol. 2, No. 8, pp. 152–154, (15 Apr. 1963) and "Stimulated optical emission of a $Tb^{3+}$ chelate in a vinylic resin matrix" by E. H. Huffman in Physics Letters, Vol. 7, No. 4, pp. 237–239, (1 Dec. 1963).

The first article reports on the maser action of a special $Eu^+$ thelate, namely Europium tris[4,4,4-trifluoro-1-(2-thienyl)]-1,3-butanedione dissolved in PMMA (Eu. TTA in PMMA). Maser action requires a very low temperature of 77 K, so that experiments are carried out in liquid nitrogen. In said first article the use of the chelate for optical amplification is neither mentioned nor suggested. It was not until 25 years later that optical amplification was invented. Moreover, an operating temperature of 77° K. is very disadvantageous for substantially any practical application. It must be borne in mind that rare earth elements have been well known for a long time as luminescent (fluorescent) substances for use in, for example, fluorescent lamps and TV screens. In the nineteen sixties, and before, much research was conducted into all kinds of possible rare earth systems for the purpose of studying and improving fluorescence. The same object is dealt with in the second, above-mentioned article which substantially corresponds to the first article, with this difference that in the second article $Tb^{3+}$ was the object of research. Also in this case the operating temperature was 77° K. This article reports that the fluorescence of Tb.TTA in PMMA is lost at 300° K. In accordance with the present invention, as described above, an optical amplifier is provided on the basis of polymeric rare earth systems which gives a satisfactory gain at moderate pump energy levels and at normal temperatures.

The following description serves to explain the invention and the insight on which it is based.

The luminescence efficiency of rare earth ions in polymeric systems was found to be very problematic. The rare earth ion excited by the laser pump can decay to a lower energy state in either a so-called radiative or a non-radiative manner. The ratio between radiative and non-radiative decay is an important factor for the luminescence efficiency. When a polymeric matrix is used, non-radiative decay is so likely to occur that no luminescence can be measured. Said non-radiative decay can have many causes. In accordance with the invention, a very important cause is the presence of high-frequency vibrations of chemical bonds, in particular O—H and C—H bonds in the polymer or in the water absorbed inside the polymer. Non-radiative decay takes place via energy transfer to or via vibrations. It is very important that the rare earth ion be shielded from such high-frequency vibrations by using a ligand which has low-frequency vibrations instead of high-frequency vibrations. In addition, the vibration energy of the low-frequency vibrations of the ligand must be so low that the energy gap of the excited rare earth ion (energy difference between excited state and relapse state) is at least a factor of 4 greater than the vibration energy.

Other factors which are important in optical amplification on the basis of a polymeric rare earth system can be summed up as follows.

To obtain optical amplification the luminescence generated must of course have a bandwidth which comprises the wavelength of the optical signal to be amplified. Also the photons of the luminescence produced must have the same phase. In other words they must be in-phase. In addition, said phase must correspond to that of the signal to be amplified. In-phase radiative decay is obtained if the population of the excited rare earth ions exceeds that of the rare earth ions in the ground state. The degree of coordination between the ligand and the rare earth ion is important. A high degree of coordination causes penetration of water molecules to be avoided or seriously impeded. Also the interaction between the ligand and the polymer matrix is a factor of importance. Said interaction can be used to avoid aggregation of rare earth ions. Such aggregation may lead to mutual energy transfer and promotes non-radiative decay. The ligand must be resistant to excitation by the optical pump.

The ligand should preferably have a high absorption at the wavelength of the pump light or excitation light. This enables the ligand to be very effectively excited after which the encapsulated rare earth ion is brought to the desired higher energy level by energy transfer. Often, this indirect excitation of the rare earth ion is much more effective than direct excitation, so that the luminescence efficiency is increased. This means that the population of bombarded (excited) rare earth ions increases at the expense of the population of ions in the ground state, so that the probability of in-phase luminescence increases. The complex of ligand and rare earth ion must dissolve in the polymer selected. As regards the choice of the polymer, a slightly more polar polymer is preferred. A higher polarity causes, in principle, the $H_2O$ concentration in the polymer to increase. In itself, this is an adverse effect because the non-radiative decay is increased via OH vibrations. However, by virtue thereof the risk of aggregate formation of complexes of rare earth ions decreases. The latter favourable effect is more important than the former adverse effect.

The polymer must have a low absorption for the wavelengths of both the pump light and the signal to be amplified. An advantage of the use of polymers, i.e. of organic compounds, is that by means of substitutions the absorption characteristic can be changed arbitrarily. For example, polymethylmethacrylate has an absorption window (i.e. no or little absorption) at 630–700 nm (window I) and at 760–780 nm (window II). These absorption windows can be shifted, for example towards the IR region, by replacing the H atom in PMMA by deuterium or, for example, by substitution with fluorine.

The polymer must be suitable to be brought into a desired configuration, in particular a fibre geometry or thin-film geometry. Said geometry is of great importance to the application of the luminescence medium in an optical amplifier, because by means of this geometry it can be ensured that the signal to be optically amplified and the pump signal are confined to the medium. In a fibre geometry said confinement can be achieved by a "stepped or graded index profile". In a film geometry this is achieved by the choice of the refractive index difference with the surroundings and by the film thickness.

Applicants have solved the above-mentioned problems and met the above-mentioned requirements in a manner described in the claims, in particular in the characterizing part of said claims.

The invention will be explained in greater detail by means of exemplary embodiments and a drawing, in which FIG. 1 diagrammatically shows an experimental set-up of an optical amplifier for measuring the degree of optical amplification, FIG. 2 diagrammatically shows an experimental set-up of an optical amplifier for measuring the emission spectrum of the amplification medium used, FIG. 3 graphically shows the optical gain as a function of the pump power (X-axis), FIG. 4 graphically shows the emission spectrum of the amplification medium, FIG. 5 graphically shows the emission spectrum of the signal beam, the amplified signal beam and the pump light.

EXEMPLARY EMBODIMENT 1

Figure 1:
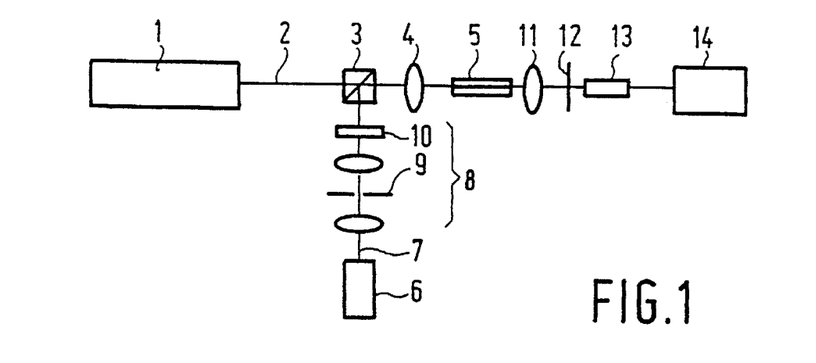

In FIG. 1, reference numeral 1 represents a pump laser ($Kr^+$ laser) which produces pump light 2 having a wavelength of 356 nm. The pump light is focused onto the fibre-shaped end portion of an amplification medium 5 via a dichroic beam splitter 3 and a lens 4. A signal beam 7 originating from the Hg discharge lamp 6 is focused onto the dichroic beam splitter 3 via a lens system 8 which comprises a pinhole 9 and a chopper 10.

Signal beam 7 passes through the beam splitter 3 and, as a result thereof, extends parallel to the pump light 2. Signal beam 7 and pump light 2 are both focused by lens 4 onto one end of the amplification medium 5. This amplification medium is in the form of a fibre. Such a fibre geometry has the advantage that the medium can readily be oriented in an optical amplification system. Moreover, such an amplification medium can be manufactured in a simple manner. For this purpose, the complex compound Europium hexafluoroacetylacetonate {$Eu(hfa)_3$} is dissolved in poly(lauryl methacrylate) (PLMA) which is liquid at room temperature. Said complex compound dissolves more readily at higher temperatures of from 70° to 80° C. owing to the reduced viscosity of the polymer PLMA. The quantity of dissolved $Eu(hfa)_3$ corresponds to 2 wt. % Eu of the overall quantity of $Eu(hfa)_3$ and PLMA. The solution obtained is sucked up into a synthetic resin capillary at an increased temperature. Said synthetic resin capillary has an inside diameter of 180 μm and is preferably made of poly(fluoroethylene) which is commercially available under the trade name Teflon. After cooling, an amplification medium is obtained whose structure and shape correspond to that of a polymeric (synthetic resin) optical fibre. Said fibre has a core of $Eu(hfa)_3$ dissolved in PLMA with a refractive index $n_k=1.476$ and a Teflon cladding which surrounds the core and which has a refractive index $n_m=1.370$. The difference in refractive index between the core and the cladding is 0.106, so that the light introduced into the fibre is confined thereto.

As a result of exposure to pump light 2, the $Eu^{3+}$ present in the amplification medium 5 is pumped to a higher energy level $^5Do$ via the ligand hfa and then decays to the $^7F_2$ level while emitting luminescence light having a wavelength of 615 nm. Thus, the ligand absorbs the pump light, is pumped to a higher level, i.e. the Singlet-1 level, decays to a lower level via a Triplet situation while emanating energy which brings $Eu^{3+}$ to the above-mentioned $^5Do$ level.

AH the light issuing from the other end of the amplification medium 5 is focused by lens 11, passes through a 615 nm interference filter 12 and reaches a detector 13 which supplies a signal to the lock-in amplifier 14. Said lock-in amplifier 14 is coupled to the above-mentioned chopper 10 for the signal beam, so that only the signal light is detected.

Figure 3:
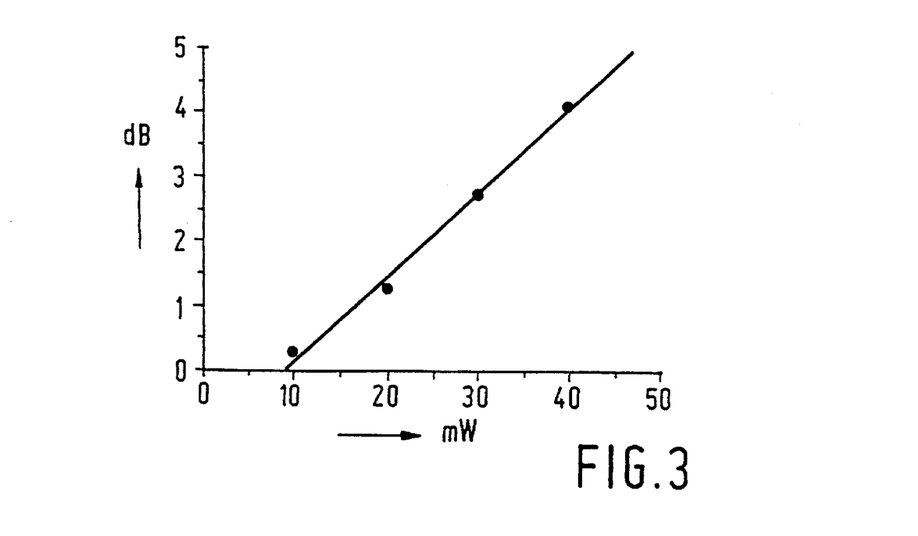

The results of this measurement are shown in FIG. 3, in which the optical gain in dB is plotted on the vertical axis as a function of the pump energy in mW plotted on the horizontal axis. The length of the amplification medium (capillary) was 1.5 cm. The graph shows that the gain increases with the pump energy. The slope of the graphical line is 0.1309 dB/mW. At a pump power of 40 mW a gain of 4.11 dB is obtained. It is noted that in the experimental set-up only about 50% of the pump power was coupled into the capillary, so that the maximum gain can in fact be a factor of 2 higher. A higher gain factor can also be obtained if another capillary length and/or a higher pump power is used.

Figure 2:
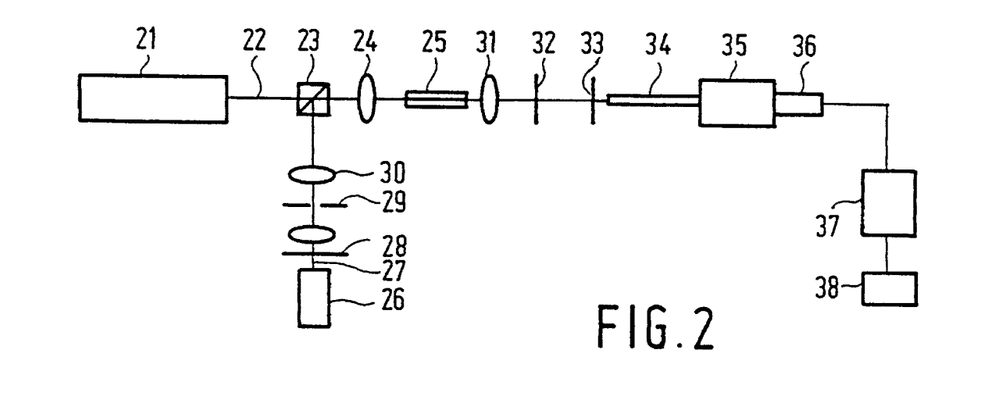
Figure 4:
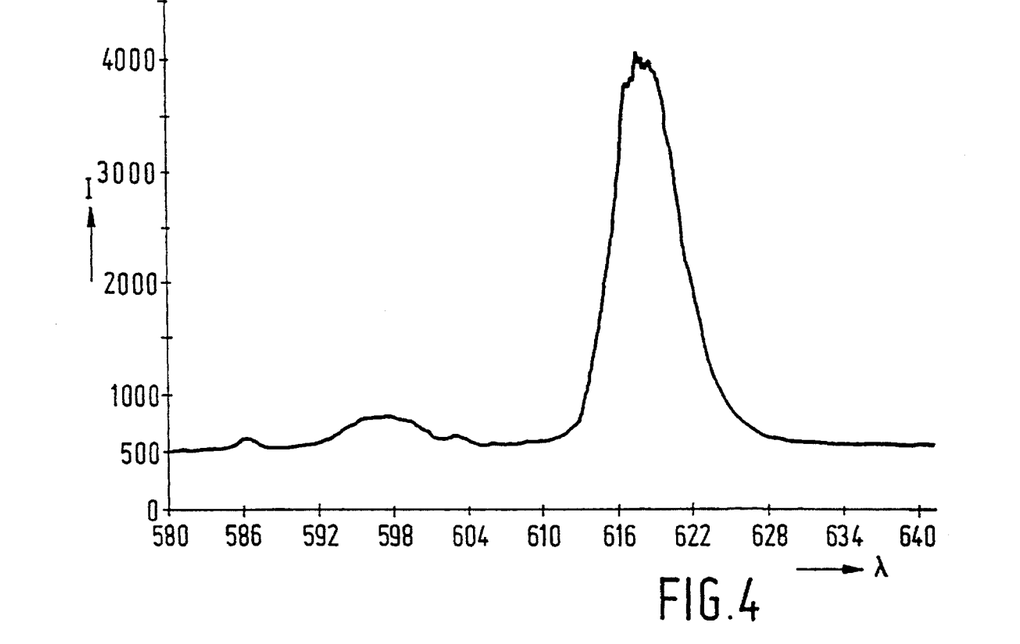
Figure 5:
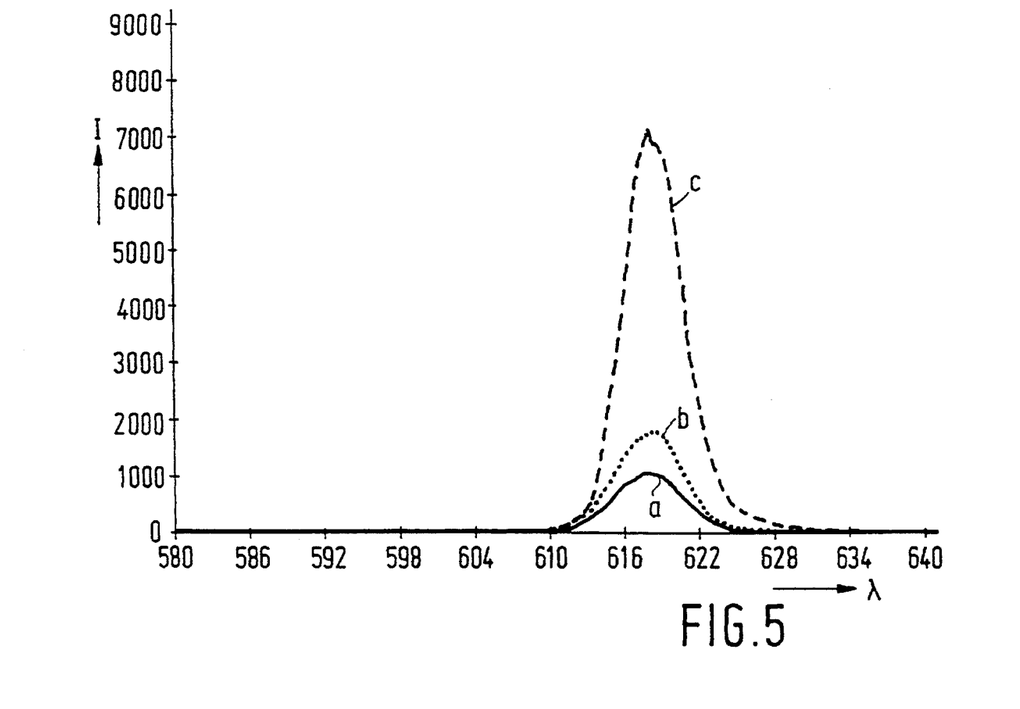

In order to determine the spectral characteristic of the optical gain, experiments were carried out by means of an experimental set-up as shown in FIG. 2. This experimental set-up broadly corresponds to that shown in FIG. 1. However, the manner of detection is different. In FIG. 2, reference numeral 21 represents a krypton pump laser whose pump light 22 is focused via dichroic mirror 23 and lens 24 onto the amplification medium 25 which corresponds to the amplification medium 5 shown in FIG. 1. Signal beam 27 originates from a Hg discharge lamp 26. Signal beam 27 is filtered by a Fabry Perot interferometer 28 which is adjusted to a value in the range between 600 and 620 nm, after which said signal beam passes through a pinhole 29 and is focused via lens system 30, dichroic mirror 23 and lens 24 onto the end of the amplification medium 25. In said amplification medium, luminescence is generated in the same manner as described with respect to FIG. 1. The light emanating from the other end (emission end) of amplification medium 25 is focused via lens 31, a 615 nm filter 32 and a neutral density filter 33 onto an optical fibre 34 which projects the light onto the input slit of a monochromator 35. The signal obtained in said monochromator is detected by means of a PMT 36 and is then analysed by means of an OMA 37 (Optical Multichannel Analyser) which is connected to plotter 38. In said OMA, the spectrum between 580 and 640 nm is analyzed while employing 1024 channels. The resultant emission spectrum of the amplification medium 25 is shown in FIG. 4, in which the wavelength in nm is plotted on the X-axis (horizontal axis) and the intensity, represented by counts, is plotted on the Y-axis. The emission peak is at 618 nm. The experimental set-up of an optical amplifier shown in FIG. 2 was also used to carry out tests in which the laser pump was switched off, so that only the signal beam 27 was recorded. When the pump was switched on the amplified optical signal obtained was directly recorded by removing the emission of the pump from the received overall light signal originating from the emission end of the amplification medium 25. The emission of the pump was also recorded separately. The results are shown in FIG. 5 in which the wavelength is plotted on the X-axis and the light intensity, represented by counts, is plotted on the Y-axis. The curve bearing reference letter a indicates the original optical signal, curve b indicates the amplified optical signal and curve c relates exclusively to the light emission originating from the pump.

Figure 6:
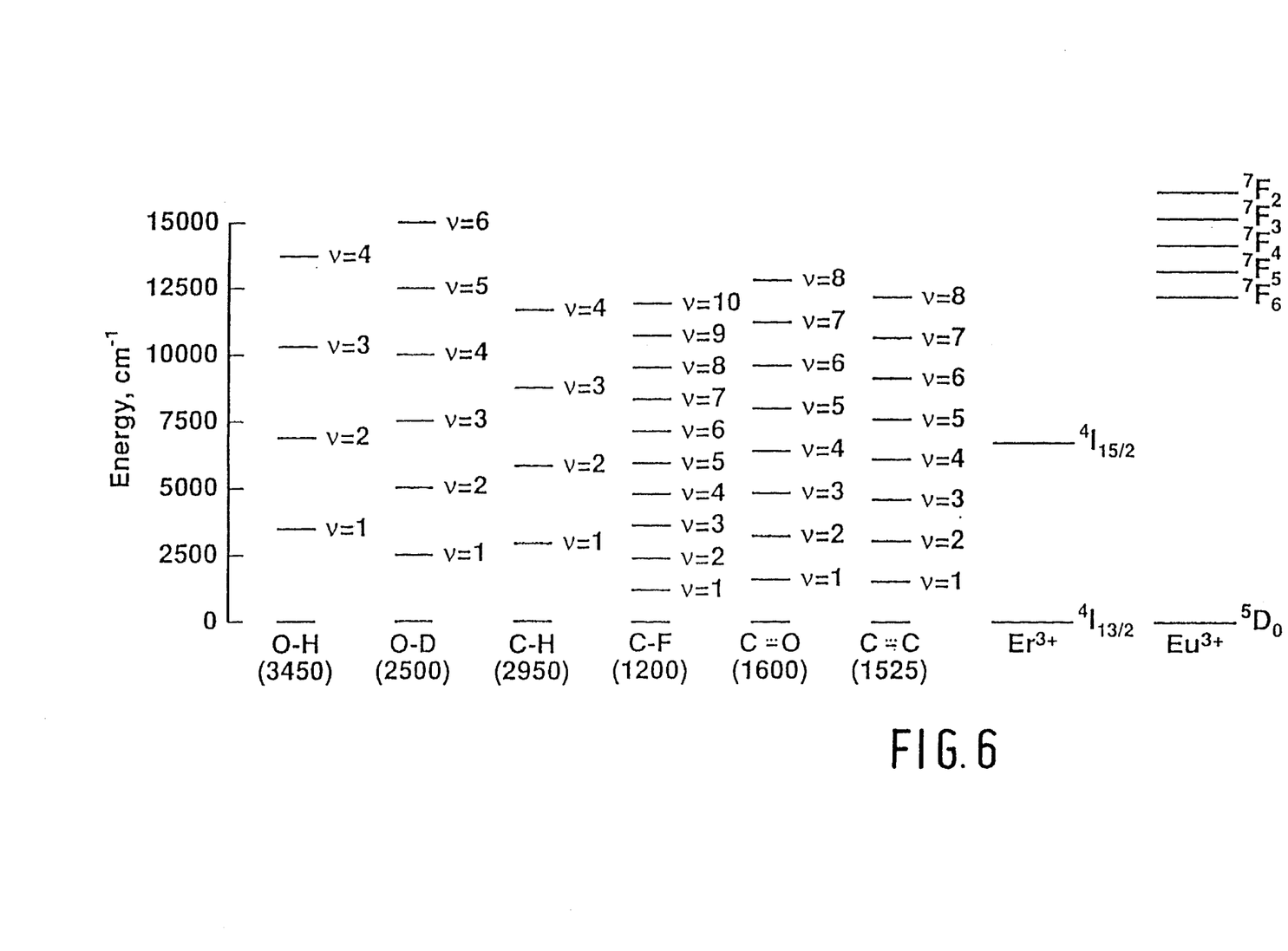
FIG. 6 shows an energy diagram of the vibration energies of a number of chemical bonds and the energy-level diagram of $Er^{3+}$ and $Eu^{3+}$.

In FIG. 6 the energy quantity, indicated in $cm^{-1}$, is plotted on the vertical axis. Various chemical bonds (O—H, O—D, C—H, C—F, C $\cdots$ O, C $\cdots$ C) and the associated vibration energy levels are horizontally indicated on the last line. These energy levels are placed in brackets and indicated in $cm^{-1}$. The C $\cdots$ O and C $\cdots$ C compounds are present in the β-diketone ligand. The vertical energy-level diagrams of $Er^{3+}$ and $Eu^{3+}$ are shown on the right-hand side of the Figure. In the vertical columns above the chemical bonds (O—H ... etc.) the overall energy of a number of vibrations $V=1, V=2 ... V=10$) is listed. The Figure clearly shows that the relatively small energy gap (energy difference) between the $^4I_{13/2}$ and $^4I_{15/2}$ level of $Er^{3+}$ is at least a factor of 4 greater than the energy of the low-frequency vibrations of the bonds C—F, C ... O and C ... C. $Eu^{3+}$ has a much greater energy gap than $Er^{3+}$. In general, the risk of non-radiative decay decreases as the amount of vibration energies necessary to bridge the energy gap increases.

EXEMPLARY EMBODIMENT 2

A quartz plate having a diameter of 3 cm and a thickness of 3 mm is provided on one side with a thin film of an optical amplification medium. This film is obtained by dissolving a complex compound of a rare earth ion and a ligand along with a polymeric substance in water or an organic solvent. The type of solvent is determined by the type of complex compound and the type of polymer. Suitable solvents are, for example, chlorobenzene, xylene, dioxane, acetonitrile, water, chloroform, dimethylformamide, methanol and mixtures thereof. The solution obtained is provided in the centre of the plate and spread over the surface of the plate by means of a spin coating process in which the solvent evaporates and a film is formed. Any residual solvent is removed in a vacuum furnace at an increased temperature. The thickness of the film was 0.5–3 μm. The composition of the film is given in the following Tables.

A luminescence spectrophotometer was used to determine the properties of the film which are important to the optical amplification, such as in particular the luminescence. To this end, the film is exposed to an excitation light beam whose frequency can be adjusted and which originates from said spectrophotometer. The emission radiation produced by the film was measured by a detector which records the intensity of the emission radiation throughout the wavelength range at any wavelength of the excitation light beam. The life time T of the emission radiation is determined by exposing the film to an excitation light pulse by means of said spectrophotometer and, subsequently, determining how much time (T) has elapsed before the intensity of the emission radiation reaches a minimum standard value.

The results axe shown in the following Tables 1–6.

TABLE 1

| amplification fdm | | | life time luminescence T(ms) |
|---|---|---|---|
| polymer | complex compound | wt. % Eu | |
| Teflon | Eu(fod)$_3$ | 0.1 | 1.5 |
| Teflon | Eu(fod)$_3$ | 1.5 | 1.0 |
| MMA | Eu(bzac)$_3$ | 1.1 | 0.5 |
| MMA | Eu(hfa)$_3$ | 2.1 | 0.5 |
| PMMA | Eu(bzac)$_3$ | 1.0 | 0.4 |
| PMMA | Eu(bzac)$_3$ | 5.0 | 0.4 |

The abbreviations in this Table have the following meaning:
Teflon: polyfluoroethylene, trade name Teflon®
MMA: methylmethacrylate. The complex compound is the dissolved monomer which is subsequently polymerized.
PMMA: polymethylmethacrylate. The complex compound and PMMA are dissolved in a solvent which is subsequently removed.
Eu(fod)$_3$: the thelate compound of Europium and heptafluorodimethyloctanedione.
EuCozac)$_3$: the thelate compound of Europium and benzoylacetone.
Eu(hfa)$_3$: the thelate compound of Europium and hexafluoroacetylacetone.
The life time (T) of the luminescence is stated in milliseconds. A relatively high value of T means a slow decay with a relatively small non-radiative decay. Thus, a relatively low value of T means a rapid decay with a relatively high non-radiative decay.

TABLE 2

Concentration dependence of the luminescence of Eu(hfa)$_3$ in a PMMA matrix.

| wt. % Eu | Intensity at luminescence peak in AU (Arbitrary Units) | life time (T) of luminescence in ms | thickness of amplification film in μm |
|---|---|---|---|
| 2.0 | 96 | 0.492 | 1.44 |
| 5.0 | 191 | 0.494 | 1.31 |
| 7.5 | 228 | 0.480 | 1.63 |
| 10.0 | 257 | 0.487 | 1.84 |

From this Table it can be derived that, for a weight percentage of Eu of about 5% or more, the intensity increase is no longer proportional and concentration quenching caused by aggregate formation starts to play a role.

TABLE 3

Film thickness as a function of the luminescence of Eu(hfa)$_3$ in a PMMA matrix.

| wt. % Eu | Intensity at luminescence peak in AU | life time (t) of luminescence in ms | film thickness of amplification medium in μm |
|---|---|---|---|
| 2.0 | 35 | | 0.55 |
| 2.0 | 46 | | 0.87 |
| 2.0 | 44 | 0.483 | 1.00 |
| 2.0 | 65 | | 1.35 |
| 2.0 | 81 | 0.475 | 2.06 |
| 2.0 | 139 | | 3.72 |

The measured intensity value at a thickness of 1.00 μm is fairly low which may have been caused by an accidentally changed adjustment of the measuring equipment. At a thickness in excess of ±1.3 μm, the influence of the film thickness on the intensity of the luminescence radiation decreases substantially.

TABLE 4

Effect of a cryptate on the luminescence of Eu(hfa) in a PMMA matrix.

| wt. % Eu | cryptate | intensity at luminescence peak in AU | life time (T) of luminescence in ms | film thickness of amplification medium in μm |
|---|---|---|---|---|
| 2 | — | 96 | 0.496 | 1.44 |
| 5 | 111 | 270 | 0.533 | 2.14 |
| 4 | 211 | 418 | 0.554 | 3.09 |
| 3 | 211 | 318 | 0.544 | 2.63 |
| 2 | 211 | 221 | 0.547 | 1.97 |
| 2 | 221 | 126 | 0.533 | 1.52 |
| 2 | 222 | 120 | 0.532 | 1.59 |

Figure 7:
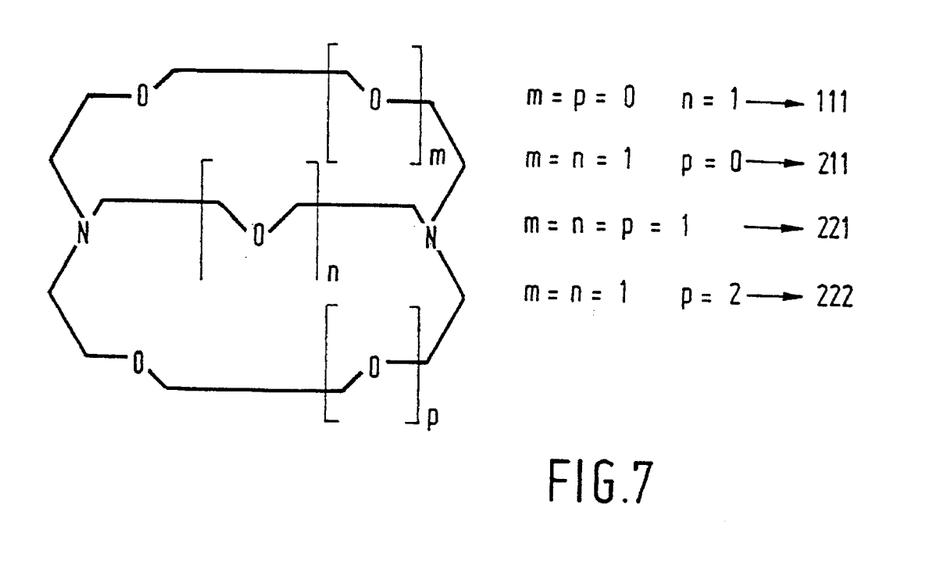
FIG. 7 shows the formula of a cryptate, FIG. 8 diagrammatically shows a simple optical communications network.

The formula of the cryptate and the code of the different types of cryptam are shown in FIG. 7.

The cryptam-comprising complexes of rare earth ions are novel substances which can be represented by the general formula $$RE(\beta\text{-diketone})_3.\text{cryptam} \qquad (3)$$

where RE is a rare earth ion and β-diketone is a compound in accordance with the above formula (1)

$$\begin{array}{ccc} X & Z & Y \\ | & | & | \\ O{=}C{-}CH{-}C{=}O \end{array} \qquad (1)$$

where X, Y and Z have the above-mentioned meaning.

The invention also relates to these novel substances which are obtained by reacting a compound of formula (4)

$$RE(\beta\text{-diketone})_3 \qquad (4)$$

with the cryptate shown in FIG. 7, at an increased temperature and in the presence of a solvent. Suitable solvents are, in particular, chlorated hydrocarbons.

By way of example, Eu(hfa)$_3$.cryptate complex is prepared as follows: a solution of 1 mmol Eu(hfa)$_3$ in 100 ml CHCl$_3$ is refluxed. A quantity of 1 mmol of cryptate is added after which the solution is boiled for 2 hours. After cooling, the solvent is evaporated in a vacuum. Without further purification, the complex thus obtained could suitably be used for the manufacture of a film of the amplification medium, the complex being dissolved in PMMA.

Table 4 shows that the addition of a cryptate has a very positive effect on the luminescence properties of the amplification medium.

TABLE 5

Polymer dependence of the luminescence of Eu(hfa)$_3$ dissolved in a polymeric matrix. A quantity of 2 wt. % of Eu is used.

| polymer | intensity at luminescence peak in AU | life time (T) of luminescence in ms | film thickness of amplification medium in μm |
|---|---|---|---|
| PMMA | 96 | 0.492 | 1.44 |
| PVAC | 32 | 0.473 | 0.79 |
| PVP | 42 | 0.649 | 0.42 |
| CTAC | 53 | 0.438 | 1.25 |
| P$_2$VP | 78 | 0.476 | 0.56 |
| PC | 35 | 0.561 | 0.56 |
| PVA | 57 | 0.529 | 0.46 |
| PS | 30 | 0.427 | 0.60 |
| PO | 12 | 0.513 | 0.35 |

The abbreviations used have the following meaning:

PMMA=polymethylmethacrylate

PVAC=polyvinylacetate

PVP=polyvinylpyrrolidone

CTAC=cellulose acetate

P$_2$VP=poly-2-vinylpyridine

PC=polycarbonate

PVA=polyvinyl alcohol (88% hydrolysed)

PS=polystyrene

PO=polyolefin

The Table shows that PMMA is a good choice. Taking the film thickness into account, the polymers PVP, P$_2$VP, PVA also yield satisfactory results as regards the luminescence intensity.

TABLE 6

Luminescence of various film-shaped amplification media, with a complex of Eu$^{3+}$ and a ligand being dissolved in a polymeric matrix.

| polymer | ligand | cryptate | wt. % Eu | intensity at luminescence peak in AU | area of peak | life time (T) of luminescence in ms | film thickness in μm |
|---|---|---|---|---|---|---|---|
| P$_2$VP | hfa | — | 2 | 78 | 575 | 0.476 | 0.56 |
| P$_2$VP | hfa | — | 2 | 90 | 701 | 0.482 | 1.48 |
| P$_2$VP | hfa | — | 5 | 166 | 1105 | 0.444 | 1.51 |
| P$_2$VP | hfa | — | 10 | 219 | 1514 | 0.464 | 1.77 |
| P$_2$VP | hfa | 211 | 1.5 | 136 | 876 | 0.439 | 0.59 |
| P$_2$VP | hfa | 211 | 5 | 312 | 2239 | 0.479 | 0.91 |
| P$_2$VP | hfa | 211 | 10 | 444 | 2762 | 0.455 | 1.13 |
| PVA | hfa | — | 2 | 57 | 384 | 0.529 | 0.46 |
| PVA | hfa | — | 5 | 170 | 1163 | 0.584 | 0.81 |
| PVA | hfa | — | 10 | 255 | 1799 | 0.573 | 1.06 |

TABLE 6-continued

Luminescence of various film-shaped amplification media, with a complex of $Eu^{3+}$ and a ligand being dissolved in a polymeric matrix.

| polymer | ligand | cryptate | wt. % Eu | intensity at luminescence peak in AU | area of peak | life time (T) of luminescence in ms | film thickness in μm |
|---|---|---|---|---|---|---|---|
| PVA | hfa | 211 | 2 | 116 | 821 | 0.565 | 0.43 |
| PVA | hfa | 211 | 2 | 275 | 1962 | 0.535 | 1.12 |
| PVA | hfa | 211 | 5 | 253 | 1833 | 0.528 | 0.45 |
| PVA | hfa | 222 | 2 | 14 | 91 | 0.559 | 1.31 |
| PVA | (dpa)₃Na₃ | — | 2 | 63 | 207 | 1.600 | 0.42 |
| PVA | (dpa)₃Na₃ | — | 5 | 132 | 495 | 1.674 | 0.43 |
| PVA | (dpa)₃Na₃ | — | 10 | 235 | 900 | 1.539 | 0.59 |
| PVA | (dpa)₃Na₃ | 211 | 2 | 54 | 175 | 1.815 | 0.40 |
| PVA | (dpa)₃Na₃ | 211 | 5 | 216 | 860 | 1.614 | 0.61 |
| PVA | (dpa)₃(NBu₄)₃ | — | 2 | 113 | 447 | 1.965 | 1.20 |
| PVA | (dpa)₃(NBu₄)₃ | — | 2 | 154 | 594 | 1.919 | 1.36 |
| PMMA | (dpa)₃(NBu₄)₃ | — | 2 | 59 | 205 | 1.838 | 0.51 |
| PMMA | (dpa)₃(NBu₄)₃ | — | 2 | 171 | 676 | 1.924 | 1.83 |
| PMMA | (dpa)₃(NBu₄)₃ | — | 2 | 163 | 630 | 1.973 | 1.97 |
| PMMA | (dpa)₃(NBu₄)₃ | — | 2 | 220 | 896 | 1.794 | 3.15 |
| PMMA | (dpa)₃(NBu₄)₃ | 211 | 2 | 172 | 669 | 1.846 | 2.05 |
| PMMA | hfa | 211 | 2 | 127 | 945 | 0.5 | 1.23 |

The abbreviation DPA stands for dipicoline acid, i.e. 2.6-pyridine dicarboxylic acid. The abbreviation Bu stands for a butyl group. The complexes of rare earth ions with 2,6-pyridine dicarboxylic acid are novel compounds which can be represented by the general formula (5)

$$\{RE(dpa)_3\}^{3-}Cat_3^+$$

where RE is a rare earth ion,
dpa stands for 2,6-pyridine dicarboxylic acid and
Cat is a cation.

Suitable cations are alkaline earth metal ions, such as $Na^+$, and $N(alkyl)_4^+$ ions wherein alkyl represents an alkyl group with 1–10 C atoms, such as a butyl group.

The invention also relates to said novel substances. Said substances are manufactured by reacting a rare earth oxide and equimolar quantities of 2,6-pyridine dicarboxylic acid and the cation hydroxide at an increased temperature and in the presence of a solvent which is subsequently removed. Suitable solvents are alcohols and mixtures thereof with water.

The complex $Eu(dpa)_3NBu_4$ can be prepared in a simple manner by dissolving Europium oxide and equimolar quantities of dipicoline acid and tetrabutyl ammonium hydroxide (30% solution in methanol) in a water-methanol mixture at 70° C. The solvent is subsequently removed in a vacuum at 50° C. The solid substance obtained does not have to be subjected to a further purification step before it is used in the optical amplification media in accordance with the invention.

It is noted that the area of the peak portion of the luminescence-intensity curve is a better measure of the luminescence than the peak value of the luminescence intensity.

A noticeable feature is that the amplification media comprising the complexes $(dpa)_3Na_3$ and $(dpa)_3(NBu_4)_3$ have a very high value of T. This means that the non-radiative decay is relatively low in favour of radiative decay. The amplification A noticeable feature is that the amplification media comprising the complexes $(dPa)_3Na_3$ and $(dpa)_3(NBu_4)_3$ have a very high value of T. This means that the non-radiative decay is relatively low in favour of radiative decay. The amplification media comprising the dpa complexes listed in the Table have an absorption peak at 270 nm. At present, absorption at said wavelength is difficult to attain with a pump laser. Mother striking feature is that amplification media comprising the complex hfa, which also contains cryptate 211, exhibit a substantially improved luminescence. However, a film-shaped amplification medium which does not comprise cryptate exhibits a better propagation of optical signals than a film-shaped amplification medium comprising hfa-cryptam. All in all, the complex rare earth ion $Eu(hfa)_3$ is preferred.

EXEMPLARY EMBODIMENT 3

Figure 8:
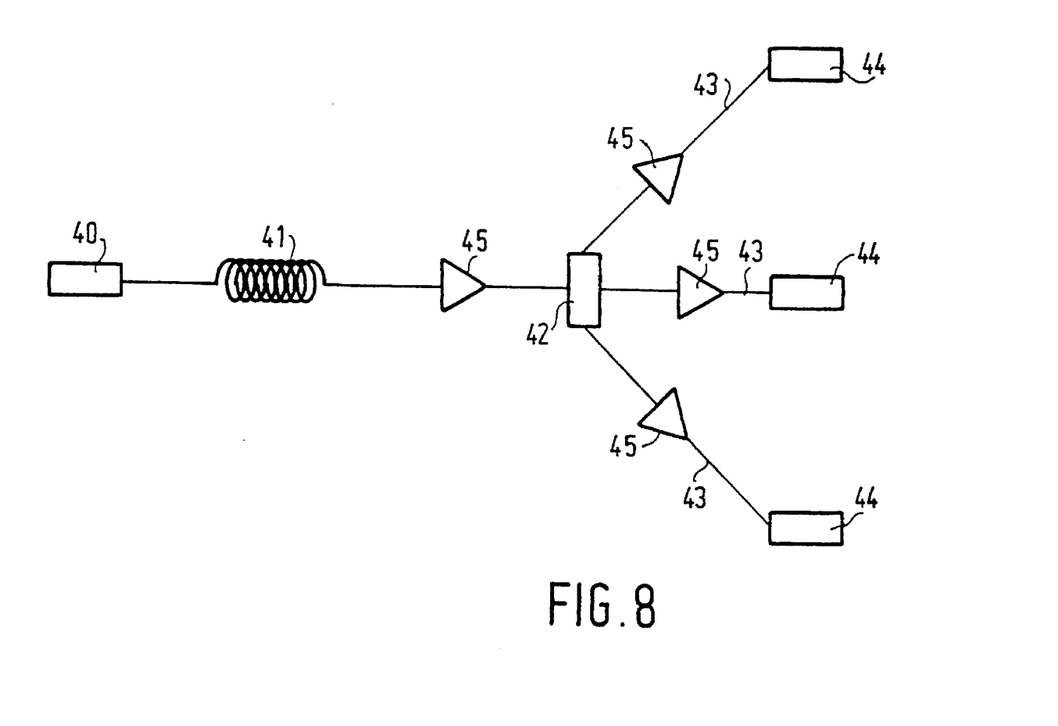

A diagrammatic example of a simple optical communications network in which optical amplifiers in accordance with the invention are used is shown in FIG. 8. In said Figure, reference numeral 40 represents an optical transmitter sending an optical signal through a polymeric optical fibre 41. It is alternatively possible to use a glass fibre instead of the preferred polymeric optical fibre. The end portion of the optical fibre is connected to a splitter 42 which divides the optical signal into, in this case three, sub-signals which are led to receivers 44 via optical fibres 43.

Fibrous optical amplifiers 45 in accordance with the invention, as described in exemplary embodiment 1, are provided between transmitter 40 and splitter 42 as well as between splitter 42 and receivers 44.

We claim:
1. A compound having the general formula

$$\{RE(dpa)_3\}^{3-}Cat_3^+ \qquad (5)$$

where RE is a rare earth ion, dpa stands for 2,6-pyridine dicarboxylic acid, and Cat is a cation.

2. A compound having the general formula $$RE(\beta\text{-diketone})_3.\text{cryptate}$$

where RE is a rare earth ion, and β-diketone is a ligand in accordance with the formula where X and Y may be the same or different and each represents either (i) an aromatic hydrocarbon group, in particular a benzene group, or (ii) an aliphatic hydrocarbon group, in particular an alkyl group having 1–10 C atoms which may be substituted with one or more halogen atoms; and Z represents any of a hydrogen atom, a halogen atom, an alkyl group having 1–10 C atoms which may be substituted with one or more halogen atoms, or a nitrogroup.

* * * * *